United States Patent [19]
Tobias et al.

[11] Patent Number: 6,100,982
[45] Date of Patent: *Aug. 8, 2000

[54] METHOD AND APPARATUS FOR DETERMINING A SCANNING TRACK FOR A NARROW COLOR BAR

[75] Inventors: Philip E. Tobias, Abington; Michael R. Chadwick, Northwales, both of Pa.

[73] Assignee: Tobias Associates, Inc., Ivyland, Pa.

[ * ] Notice: This patent is subject to a terminal disclaimer.

[21] Appl. No.: 07/813,163

[22] Filed: Dec. 24, 1991

[51] Int. Cl.$^7$ ................................ G01B 11/00; G01J 3/50
[52] U.S. Cl. ........................... 356/375; 356/402; 356/425
[58] Field of Search ..................... 356/402, 406, 356/407, 425, 375; 250/226; 364/526

[56] References Cited

U.S. PATENT DOCUMENTS

| | | | |
|---|---|---|---|
| 4,289,405 | 9/1981 | Tobias | 356/407 |
| 4,505,589 | 3/1985 | Ott et al. | 356/406 |

Primary Examiner—F. L. Evans
Attorney, Agent, or Firm—Edward J. Kondracki

[57] ABSTRACT

The present method includes moving a light reading head along the length of a color bar whose length lies in an X direction and simultaneously therewith moving said light reading head in a Y direction, where the Y direction is substantially orthogonal to said X direction. The method further involves keeping an account of the positions of said light reading head and noting, as a benchmark position, each time the light reading head passes in the Y direction from a position off the color bar to a position over the color bar. The method further involves computing a desired Y value for each of said benchmarks and a plurality of interpolated Y values linking adjacent desired Y values to form a track which (in a preferred embodiment) lies substantially along the middle of the color bar over which to guide said light reading head during a subsequent scan. The apparatus comprises a light reading head, with an aperture that projects a light spot which has a diameter of ½ mm, in a preferred embodiment. The light reading head is held by a device which moves the head in both the X and Y directions, simultaneously, and transmits signals to a computing device to compute the above mentioned desired Y values and the interpolated values lying between adjacent desired Y values.

10 Claims, 3 Drawing Sheets

METHOD AND APPARATUS FOR DETERMINING A SCANNING TRACK FOR A NARROW COLOR BAR

BACKGROUND OF THE INVENTION

The invention described in U.S. Pat. No. 4,289,405 is directed to determining the optical densities of the individual color swatches which make up a color bar, printed on a sheet. The color swatches represent, for instances, the colors of the inks which are being employed in a four color printing operation. The device (and the printed product resulting from its use) described in U.S. Pat. No. 4,289,405 has been very successful but it does have a limitation for certain applications. In using the device described in U.S. Pat. No. 4,289,405, there is a preference that the printing procedure provide a color bar whose height is at least 5 mm. The preference of 5 mm comes into being because the alignment of the color bar, relative to the path of the light reading head, is done "by eye." We have found that there is increased error in this alignment when less time is given over to the alignment procedure. Under heavy production demands, which appear to be the norm, there is a problem in taking sufficient time to properly align the reading head. A misalignment of the color bar relative to the optical scanning path can produce serious errors in the optical density readings. For instance the densitometer could be reading the density of the color bar and/or either "non-printed on" white paper or the color of a piece of artwork that should be printed and happens to be close to the color bar.

The problem becomes more critical with the web presses. In the use of web presses, a small amount of additional paper beyond that require to fold and trim the signatures may represent a very costly annual consumption of paper. As a result, in order to help control the color quality of the printed job, a color bar is used, but generally the color bar can only be 3 mm in height. A color bar of 3 mm height can be fitted into the permissible trim area of the folded signature. Accordingly, no additional paper, other than the normal amount which is trimmed off, is employed. However, the reduced height (i.e. 3 mm) of the color bar causes the alignment problem, described above, to become more critical and it is to such critical alignment that the present method and apparatus is directed.

SUMMARY OF THE DISCLOSURE

The present method is directed initially to effecting a quick scan (by a light reading head) of a color swatch bar. During the quick scan the reading head is moved rapidly in two directions, i.e. in the X direction and in the Y direction and the X and Y directions are substantially orthogonal to each other. The movement of the reading head is under the direction and control of a computer (programmed to effect such X and Y movement) and the computer keeps an account of where the reading head is located, at all times, with respect to the X and Y directions. In addition, and simultaneously therewith, the light reading head provides signals which after being processed advise the computer that the reading head has passed through a meaningful change of optical density. That is to say, when the reading head passes from the white background of the "non-printed on" area to the color bar, the signals from the reading head will be interpreted to mean that the reading head has moved over the color bar. Since the computer is keeping an account of the X and Y direction positions of the reading head, the computer will record (in the X and Y directions) where the meaningful optical density transitions take place. Such a recognized transition will be considered a benchmark. At each benchmark position the system will know (assuming that the color bar is 3 mm high) that the middle of the color bar will be 1.5 mm, in the Y direction, from the recorded benchmark position. The X and Y values at each 1.5 mm location are recorded as a desired scan track location. The computer is programmed to interpolate Y positions between the desired scan track locations so that there is generated a plurality of Y positions that represent the guide scan track over which the reading head will be passed. In a preferred embodiment the reading head is passed over the guide scan track, on the return scan, to read the densities of the swatches on the color bar.

The present device includes a reading head, with a relatively small main beam aperture, and the reading head is held in a frame like assembly or a principal frame. The frame like assembly is moved in the X direction (i.e., right and left in the drawing) by a first stepping motor. It should be understood that while in a preferred embodiment a stepping motor is used, a servo motor arrangement could be employed. The first stepping motor moves the frame like assembly in response to pulses that it receives from a computer. The computer keeps an account of the pulses so generated and thereby is aware of the positions in the X direction (at all times) of the reading head. Within the frame like assembly the reading head is mounted to be moved by a second stepping motor in the Y direction (i.e., up and down in the drawing). As was true with the first stepping motor, described above, the second stepping motor moves the reading head in the Y direction in response to pulses from a computer. The computer keeps an account of the pulses so generated and thereby is aware of the Y positions of the reading head at all times.

The objects and features of the present invention will be better understood in view of the description hereinafter, taken in conjunction with the drawings wherein.

Figure 1:
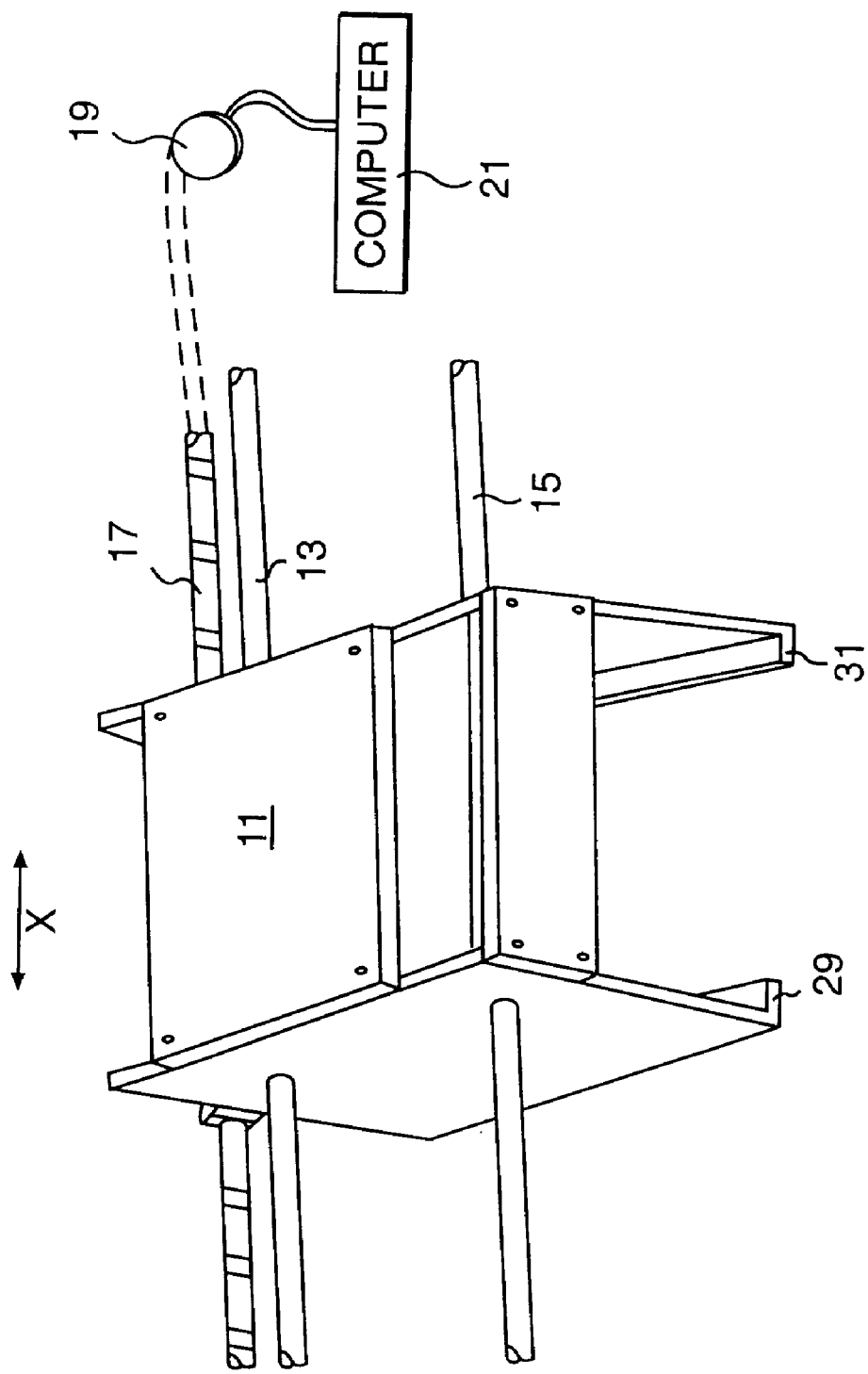
FIG. 1 is a pictorial view depicting the principal frame which effects the X direction movement.

Consider FIG. 1. In FIG. 1 there is shown a principal frame 11. The principal frame 11 is slidably held onto two bearing rods 13 and 15. The principal frame 11 is locked onto a belt 17. The belt 17 is driven by a stepping motor 19. As the stepping motor 19, under control of a computer 21, advances the belt 17 it also advances the principal frame 11. The belt 17 is advanced step by step by the stepping motor 19 and the stepping motor 19 causes the step by step movement in response to pulses from the computer 21. At the same time the computer 21 records each pulse so that the computer 21 "knows" where the principal frame, and therefore the reading head, is located. In other words, the number of pulses the computer generates is indicative of the position of the reading head. In a preferred embodiment the stepping motors 19 and 42 are Model HY200-2215-220A4 manufactured by M.A.E. Division of Olivetti. In a preferred embodiment the computer 21 is a Model PC8286 manufactured by INTEL CORPORATION.

Figure 2:
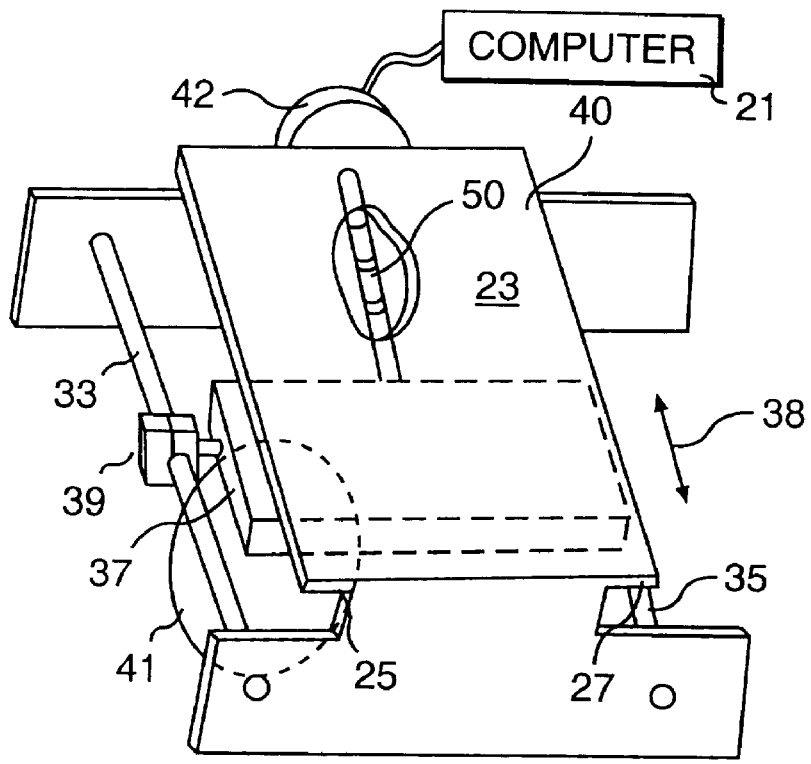
FIG. 2 is a pictorial view depicting the holder device which fits into and is held by the principal frame device and which effects the Y direction movement.

Consider FIG. 2 with FIG. 1. FIG. 2 depicts a holder frame 23 which fits into the principal frame 11, shown in FIG. 1. Note in FIG. 2 the flange like structures 25 and 27. When the holder frame 23 is assembled with the principal frame 11, the flange like structures 25 and 27 are located within the principal frame 11 resting on the ledge like structures 29 and 31. In such an assembly, the holder frame 23 is locked onto the principal frame 11 by structure not shown. Note that the holder frame 23 includes two bearing rods 33 and 35. The reading head holder 37 is slidably coupled to the bearing rods 33 and 35 by support devices, such as the support device 39, and a second such support device located on the right hand side of the drawing but not shown. While the support devices support the reading head holder 37 they do permit the reading head holder 37 to be moved as indicated by the arrow 38. The reading head holder 37 is coupled to a lead screw located under plate 40. In FIG. 2 plate 40 is shown with a "broken away section so that the lead screw 50 can be seen. The lead screw 50 is driven by the stepping motor 42. The stepping motor 42 in turn is driven by pulses from computer 21. As has been true, with respect to recording the X positions of the reading head, the computer 21 records, or remembers, the number of pulses generated and therefore "knows" at all times the Y position of the reading head.

Figure 3:
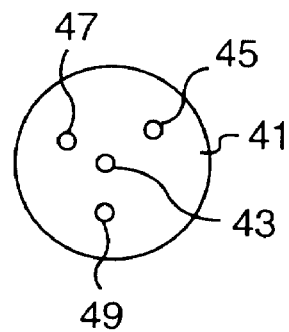
FIG. 3 depicts the under side of the reading head.
Figure 4:
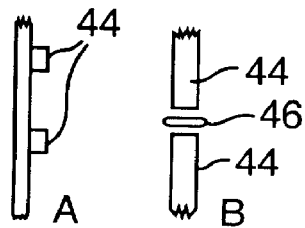
FIG. 4 depicts a structure to generate "home position" signals.

The reading head 41 is shown in FIG. 2 disposed under the reading head holder 37. The underside of the reading head 41 is depicted in FIG. 3. A beam of light is passed through the aperture 43 and is reflected to be received by the light sensitive devices 45, 47 and 49. The light beam emanating from the aperture 43 projects an image of 0.5 mm on the background area on which the color bar is printed as well as on the color bar when the beam passes thereover. A more detailed description of the operation of such a reading head is found in U.S. Pat. No. 4,289,405. FIG. 4 depicts an optical coupler 44, which is mounted below plate 40. Also shown in FIG. 4 is a light interrupter 46 which is mounted on reading head holder 37. When the reading head holder 37 returns to its "home" position, the interrupter 46 interrupts the light passing across the optical coupler and this action provides a signal indicating that the reading head is in the "home" position.

Figure 5:
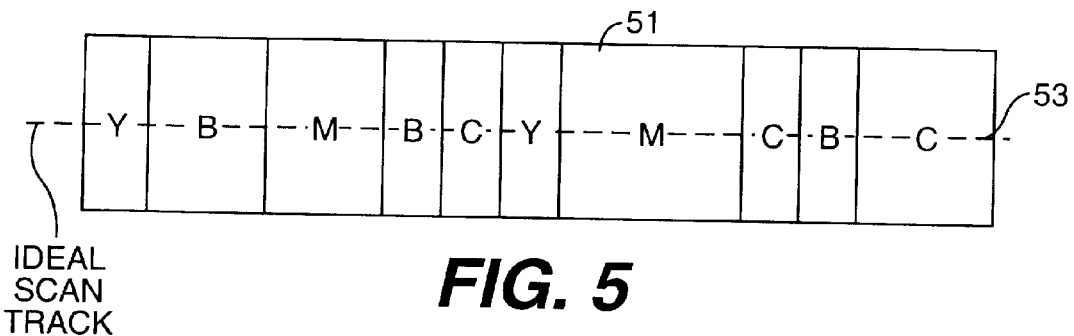
FIG. 5 depicts the scan track of a reading head which has been ideally aligned with the color bar.
Figure 6:
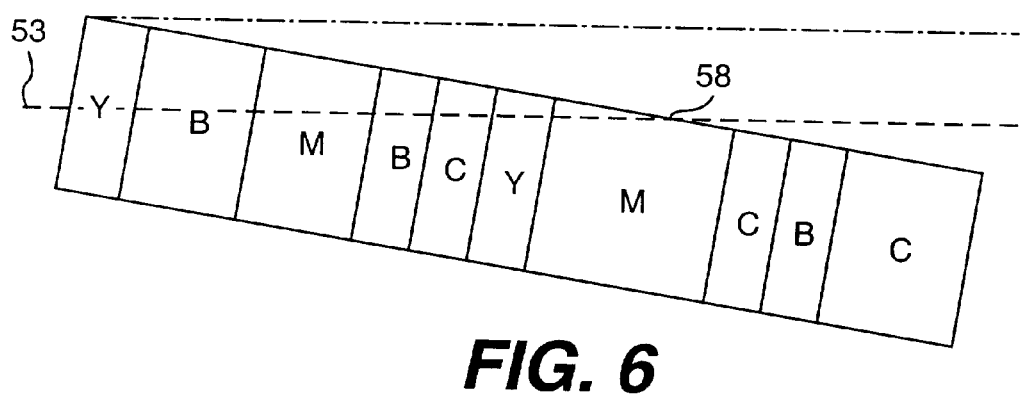
FIG. 6 depicts the scan track of a reading head which has not been properly aligned with a color bar.

Consider FIG. 5 which depicts a track for a reading head which is ideally aligned with a color bar. Note in FIG. 5 that there is a color bar 51. The color bar 51 is arranged with swatches of different colors and different lengths. The swatches are identified as Y (yellow), B (black), M (magenta), and C (cyan). If that color bar 51 is 3 mm in height (as is present under the web printing conditions described above) then to arrange for a useable track, such as track 53, considerable care and time must be taken. It is to the reduction of such care and time that the present invention is directed. Consider FIG. 6 which depicts a color bar 51 which is askew with respect to the ideal scan track 53. Note that if the relationship of the reading head scan track and the color bar were such as depicted as in FIG. 6 and the reading head were passed over the color bar 51, when it gets to point 58 it would no longer be reading optical densities of the swatches of the color bar. Under the conditions just described, the reading head would be reading optical densities of the table, or the mat, or the printed area, all of which may lie close to where the color bar is located. It follows that if a 3 mm color bar were located as is color bar 51, in FIG. 6 there would be serous errors in the readings of the optical densities as the reading head would advance to the right (in the drawing).

The present method and device provides a means for quick scanning of the color bar, (and even if the color bar is somewhat askew) to provide data that enables a determination of a desirable scan track over which to pass the reading head.

Figure 7:
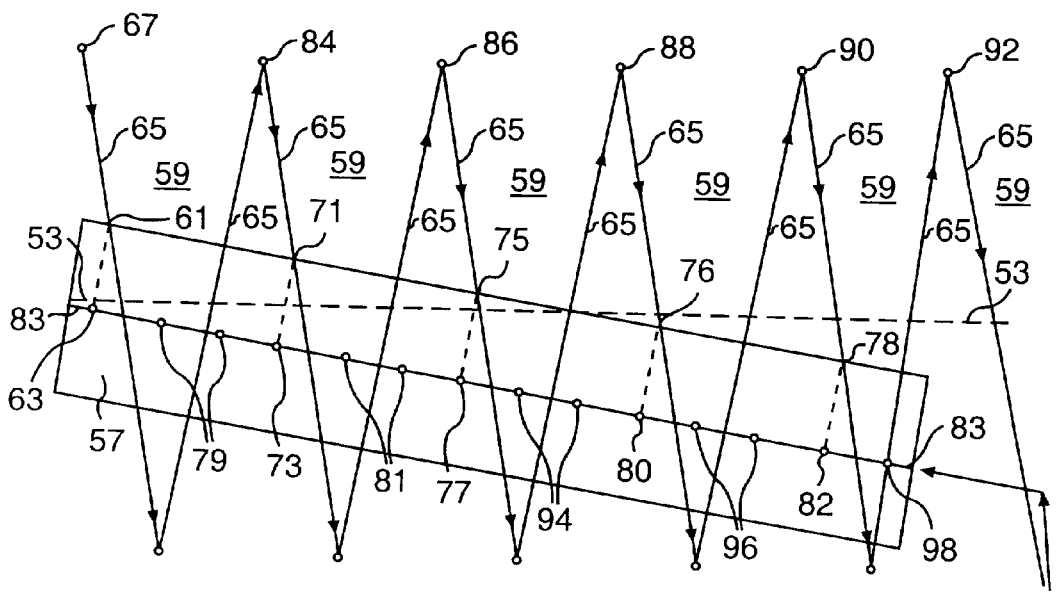
FIG. 7 depicts a scan track which is employed to generate scan track values for a desirable scan of a color bar.

Consider FIG. 7. FIG. 7 depicts a color bar 57 which is located askew with respect to an ideal track, if we consider scan track 53 in FIG. 7, as the ideal scan track, or a normal scan track of a reading head. In accordance with the present method and device, the read head 41 is carried in both the X and Y directions. When the difference in optical densities between the non-printed section 59 and the color bar 57, such as at benchmarks 61, 71, 75, 76 and 78 are recognized by the read head 41, the X and Y values at those benchmarks are recorded. The computer 21 is programmed to record the X and Y values at the benchmarks. As will be discussed below, the computer 21 is further programmed to calculate a set of X and Y values for points 63, 73, 77, 80, and 82 from the values determined at benchmarks. The X and Y values for points 63, 73, 77, 80, and 82 are considered desired scan track values. In the preferred embodiment the points 63, 73, 77, 80, and 82 are 1.5 mm (in the Y direction) from benchmarks but other desired scan track values could be generated. It should be understood that the calculations of the desired scan track values can be accomplished while the read head 41 is moving to the right in the drawing or can be calculated, along with the interpolated values, after the fast scan has been completed and before the return scan starts. The fast scan path for the read head continues along the path shown by line 65. Points 67, 84, 86, 88, 90, and 92 are the "home" positions and are recognized by the computer 21 as the zero positions.

As mentioned above, the fast scan continues along the path shown by line 65 and after each excursion over the color bar returns to a home position or a zero position. As the fast scan continues along line 65, from the home position 84, the reading head reaches point 71. A change in optical density at point 71 indicates to the computer 21, that the reading head is moving over the color bar 57. It should be noted that when the 0.5 mm spot moves across the edge between the background color and the swatch on the color bar, some time is involved for the meaningful change of optical densities to be recognized. However, that time is so short that for practical purposes the time can be considered instantaneous. The computer 21 takes into account the X and Y values at point 71 and (in one mode) calculates X and Y values for the point 73. The X and Y values at point 73 represent a second set of desired scan track values. The fast scan continues to home position 86 and rightward and downward to benchmark 75, whereat the reading head experiences a meaningful change of optical densities. By way of example, a meaningful change could be from reading a color density of 0.10 for a white, "non-printed on" background, to reading a color density of 0.80 to 0.90 for magenta, yellow or cyan. In accordance with the meaningful change of optical densities the computer calculates the X and Y values for point 77 which represents the third set of desired scan track values. The fast scan continues and the system repeats the process set forth above calculating values for points 80 and 82. When the end of the color bar 57 has been reached the read head is now made ready to return along the preferred scan track 83 on the color bar. As can be seen in FIG. 7 the fast scan track 65 is substantially sinusoidal.

As described above it should be understood that while the fast scan was taking place, the computer (in one mode) was calculating (in accordance with a program), or interpolating, the values for positions 79 located between the desired track positions 63 and 73. In addition, the computer was interpolating the values for positions 81, 94, 96 and 98 which lie between the desired scan track positions 73, 77, 80, 82, and the end of the color bar. The interpolated values are calculated between all the desired scan track valued points which have been determined along the color bar. In this way there is a set of interpolated scan track values generated which becomes the values that guide the reading head on the return trip, or on the return scan. In other words on the return scan, the reading head would pass along path 83 and the holder frame assembly, described earlier, would be nudged in the Y direction as it reaches calculated X direction values thereby causing the assembly to follow the track 83. In this way the readings of the swatches on the color bar will be desirable readings and a hastily aligned color bar will not lead to improper readings.

What we claim is:

1. A method for determining a path along which to pass a reading head to determine optical densities of swatches of a color bar wherein said color bar has length and width dimensions and wherein said length dimension lies along an X axis direction and wherein said width dimension lies along a Y direction and wherein said X and Y directions are substantially orthogonal to each other comprising the steps of:

1. Moving light reading head means in said X direction and in close proximity to said color bar;
   2. Keeping an account of positions of said light reading head means as it moves in said X direction;
   3. Simultaneously, with steps 1 and 2, repeatedly moving said reading head means in said Y direction, for limited distances, at least partially across said color bar, to determine benchmark occasions when there are determined meaningful differences, in optical densities, between said color bar and adjacent areas;
   4. Computing, as benchmarks, the values of X distances whereat benchmark occasions are determined;
   5. Computing, in the Y direction, desired scan track values respectively for each of said benchmarks computed; and
   6. Computing a set of interpolated scan track values located between said desired scan track values by which to guide said reading head means during a scan of said color bar.

2. A method according to claim 1 wherein in step 1 the moving of said light reading head means starts from a zero valued position.

3. A method according to claim 1 wherein moving said reading head means in accordance with step 1 and step 3 moves said reading head means in a substantially sinusoidal path.

4. A method according to claim 1 wherein step 4 includes keeping an account of the values of X distances and step 5 includes keeping an account of desired track values and step 6 includes keeping an account of interpolated scan track values.

5. A system to create a path along which to pass a light reading head means to determine optical densities of swatches of a color bar wherein said color bar has length and width dimensions and wherein said length dimension lies along an X axis direction and wherein said width dimension lies along a Y direction and wherein said X and Y directions are substantially orthogonal to each other comprising in combination:

first frame means movably mounted on first bearing means whereby said first frame means is enabled to move along said first bearing means in said X direction;

moving means connected to said first frame means to cause said first frame means to be moved along said first bearing means;

second frame means formed to be assembled with said first frame means to move with said first frame means in said X direction, said second frame means including a light reading head means and with said second frame means further formed to enable said light reading means to be moved in said Y direction; and computer means connected to said moving means and to said second frame means to cause said moving means to move said first frame means and to cause said second frame means to move said light reading head means and said computer means formed to keep an account of said X direction values and said Y direction values respectively of the movement of said first frame means and said reading head means.

6. A system according to claim 5, wherein said moving means includes a belt which is secured to said first frame means and also includes a first stepping motor coupled to said belt and connected to said computer means.

7. A system according to claim 6 wherein said second frame means includes a second stepping motor means coupled to said reading head means and connected to said computer means.

8. A system according the claim 7 wherein said second frame means fits within said first frame means whereby when said moving means moves said first frame means it also moves said second frame means.

9. A system according the claim 7 wherein said second stepping motor means is coupled to said reading head means by a lead screw.

10. A system according to claim 5 wherein said second frame means includes a pair of bearing means and support means coupled to said bearing means.

\* \* \* \* \*